United States Patent
Ketcham et al.

(10) Patent No.: US 6,609,197 B1
(45) Date of Patent: Aug. 19, 2003

(54) METHOD AND SYSTEM FOR SECURE EMERGENCY ACCESS TO NETWORK DEVICES

(75) Inventors: Carl C. Ketcham, Taylorsville, UT (US); Stanford K. Acomb, West Jordan, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/296,192

(22) Filed: Apr. 22, 1999

(51) Int. Cl.[7] .............................. H04L 9/32; G06F 12/14
(52) U.S. Cl. ...................... 713/155; 713/162; 713/182; 713/202; 380/264
(58) Field of Search .............................. 713/153, 155, 713/162, 163, 182, 183, 184, 200, 201, 202; 380/211, 264

(56) References Cited

U.S. PATENT DOCUMENTS

| | | | | |
|---|---|---|---|---|
| 5,237,610 A | * | 8/1993 | Gammie et al. ............ | 380/211 |
| 5,677,953 A | * | 10/1997 | Dolphin ...................... | 380/201 |
| 5,708,963 A | * | 1/1998 | Mobley et al. ............ | 455/12.1 |
| 6,173,402 B1 | * | 1/2001 | Chapman .................... | 713/182 |

\* cited by examiner

*Primary Examiner*—Justin T. Darrow
(74) *Attorney, Agent, or Firm*—McDonnell Boehnen Hulbert & Berghoff

(57) ABSTRACT

Methods and system for providing secure emergency access to network devices. The methods and system described herein can be used to provide secure emergency access to network devices such as routers, telephony switching hubs, etc. Secure emergency access helps close security holes for providing access to configuration parameters in a network device by using an encrypted unit-unique password. The secure emergency access includes generating an encrypted emergency unit-specific password for a specific network device using a unique serial number for the specific network device and a global password used for a type of network device that includes the specific network device. The encrypted emergency unit-specific password is valid only on the specific network device with the unique serial number. The encrypted emergency unit-specific password is used to regain access to a specific network device for which an original password has been lost or misplaced. The secure emergency access can also be used for wireless phones to limit access to a network device identifier and telephone number data to prevent "cloning."

21 Claims, 5 Drawing Sheets

METHOD AND SYSTEM FOR SECURE EMERGENCY ACCESS TO NETWORK DEVICES

FIELD OF THE INVENTION

The present invention relates to configuring network devices. More specifically, it relates to a method and system for secure emergency access to network devices.

BACKGROUND OF THE INVENTION

During the manufacturing process, many network devices incorporate a password to allow access to the network device. The password allows configuration parameters on the network device to be changed. The configuration parameters typically cannot be changed without using the password.

Many network devices are password protected to prevent tampering of information in the network device. For example, a password may be used to prevent routing tables in a router from being tampered with. As is known in the art, a router routes data packets to an appropriate device on a network topology. A password may also be used to protect configuration parameters in a telephony switching hub from tampering. As is known in the art, a telephony switch hub switches data among multiple channels and/or time slots.

From time-to-time, an owner of network device may lose or forget a password associated with a network device. A lost or forgotten password prevents an owner from modifying configuration parameters in a network device. There are several methods known in the art to allow an owner of a network device to replace a lost or forgotten password.

An owner of a network device may call technical support for a company that is selling the network device. A network device typically is operated by a specific version of computer software. Technical support personal may provide an emergency or backdoor password to the owner of the network device. The emergency or backdoor password is typically generated or retrieved based on a specific version of computer software being used in the network device. However, there are problems associated with using such a method to provide emergency or backdoor passwords. If the emergency or backdoor passwords become generally known, such as being posted on a computer bulletin board, the Internet, a newsgroup, other publication, any network device running the specific version of computer software becomes vulnerable to malicious tampering by unauthorized persons. A company selling network devices for which a specific version of computer software has been compromised, may have to provide software or firmware updates to all customers who have purchased the network devices. This is very expensive to the company selling the network devices.

Another problem associated with providing emergency or backdoor passwords based on a particular version of computer software is that the computer software and password may be used to "clone" another network device, without paying for a legitimate copy of computer software used on the network device.

Thus, it is desirable to a method to protect network devices with password yet allow emergency access to the network device. The method should allow a unique password to be generated for each network device. The password would be useable only on the network device and not all network devices running the same version of computer software.

SUMMARY OF THE INVENTION

In accordance with preferred embodiments of the present invention, some of the problems associated with secure emergency access to network devices are overcome. A method and system for secure emergency access to a network device is provided.

One aspect of the invention includes a method for creating a unit-specific password for a specific network device. The method includes obtaining a unique serial number for a specific network device. A global password used for a type of network device that includes the specific network device is obtained. An encrypted unit-unique password is generated for the network device with the unique serial number and the global password. The encrypted unit-unique password is stored in non-volatile storage on the network device.

Another aspect of the invention includes a method for providing an emergency unit-specific password for a specific network device. This method includes obtaining a unique serial number for a specific network device. A global password used for network devices that include the specific network device is obtained. An encrypted emergency unit-specific password is generated for the specific network device with the unique serial number and the global password. The encrypted emergency unit-specific password is valid only on the specific network device with the unique serial number.

Another aspect of the invention includes a method for using an encrypted emergency unit-specific password for a specific network device. This method includes obtaining an encrypted emergency unit-specific password on a specific network device. An encrypted unit-unique password is obtained for the specific network device from non-volatile storage on the specific network device. The encrypted unit-unique password includes a unique serial number and a global password used for a type of network device that includes the specific network device. A test is conducted to determine whether the encrypted emergency unit-specific password matches the encrypted unit-unique password for the specific network device. If the passwords match, access is allowed to configuration parameters on the specific network device. If the passwords do not match, access is denied to configuration parameters on the specific network device.

Another aspect of the invention includes an emergency password system. The emergency password system includes an original encrypted unit-unique password, an emergency encrypted unit-specific password, and an emergency encrypted unit-specific password generator. However, more or fewer components can also be used in the emergency password system, and the present invention is not limited to this emergency password system.

The methods and system described herein may be used to provide secure emergency access to network devices. Secure emergency access helps close security holes for providing access to configuration parameters in a network device by using an encrypted unit-unique password.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Network System

Figure 1:
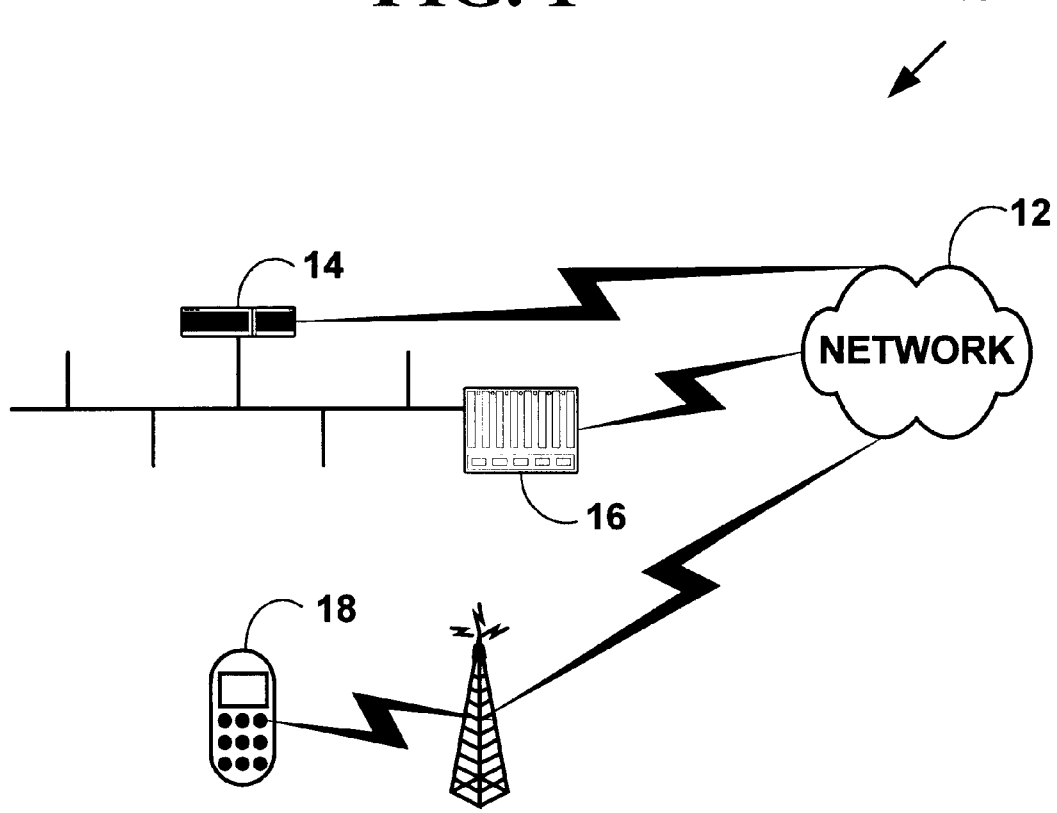
FIG. 1 is a block diagram illustrating an exemplary network system.

FIG. 1 is a block diagram illustrating an exemplary network system 10 for a preferred embodiment of the present invention. The network system 10 includes a computer network 12 with multiple network devices 14, 16, 18. Only three network devices 14, 16, 18 are illustrated in FIG. 1. However, the network system 10 is not limited to two network devices and more network device can also be used. The network system 10 would typically include hundreds or thousands of network devices. The computer network 12 includes the Internet, intranets, a Public Switched Telephone Network ("PSTN") or other computer networks.

In one exemplary preferred embodiment of the present invention, network device 14 includes a router, network device 16 includes a telephony switching hub and network device 18 includes a wireless phone. As is known in the art, a router routes data packets to an appropriate device on a network topology. A telephony switching hub switches data among multiple channels and/or time slots. An exemplary telephony switching hub is described in U.S. Pat. No. 5,528,595, granted to Dale M. Walsh et al., incorporated herein by reference. However, the present invention is not limited these specific network devices, and other network devices can also be used.

Network devices 14, 16, 18 for preferred embodiments of the present invention include network devices that can interact with network system 10 with based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol Forum ("WAP") Forum. However, network devices based on other standards could also be used. IEEE standards can be found on the World Wide Web at the Universal Resource Locator ("URL") "www.ieee-.org." The ITU, (formerly known as the CCITT) standards can be found at the URL "www.itu.ch." IETF standards can be found at the URL "www.ietf.org." The WAP standards can be found at the URL "www.wapforum.org."

An operating environment for network devices of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Creating a Secure Unit-unique Password for a Network Device

Figure 2:
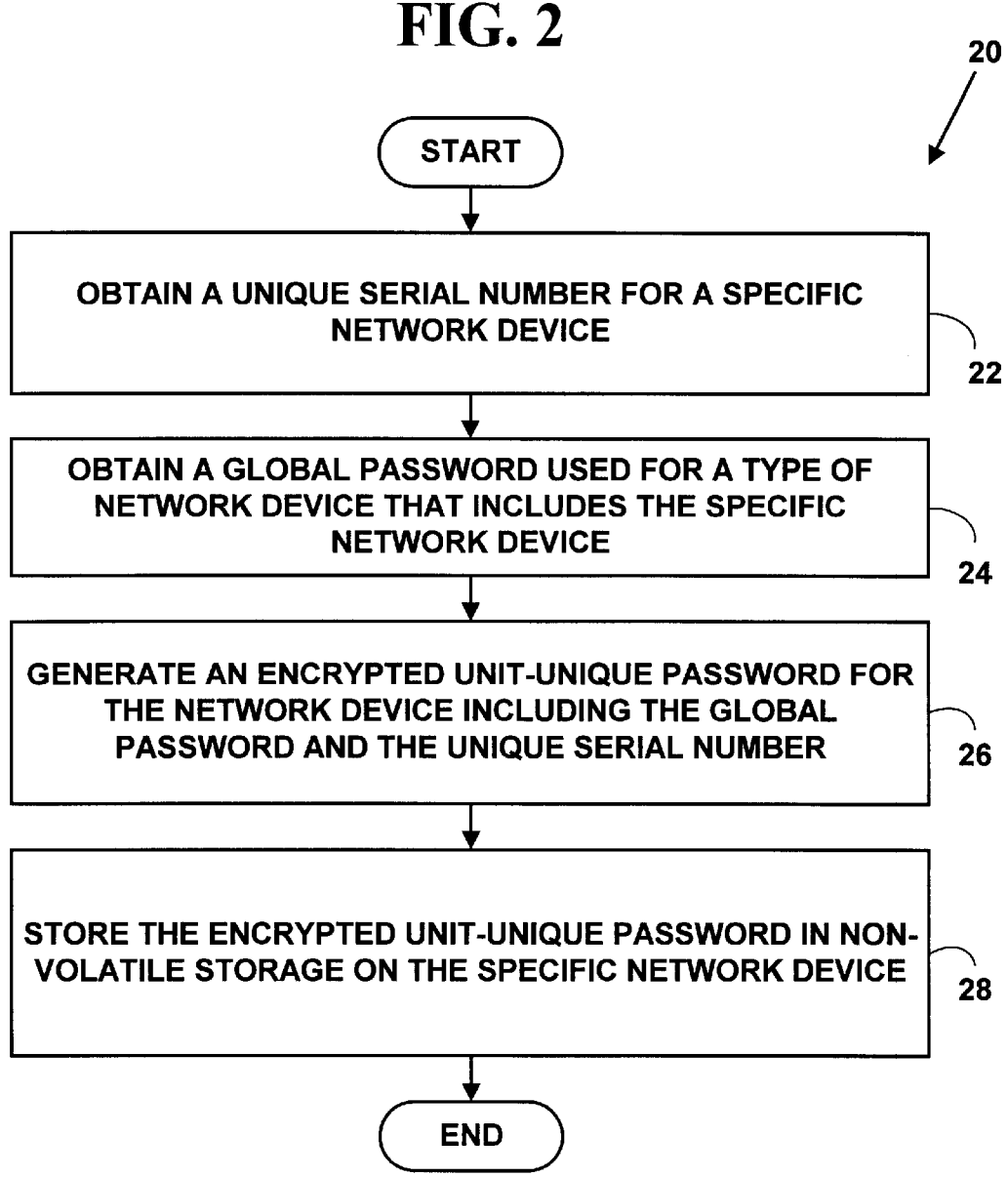
FIG. 2 is a flow diagram illustrating a method for creating a secure unit-unique password for a network device.

FIG. 2 is a flow diagram illustrating a Method 20 for creating a secure unit-unique password for a network device. At Step 22, unique serial number is obtained for a specific network device. At Step 24, a global password used for a type network device that includes the specific network device is obtained. At Step 26, an encrypted unit-unique password is generated for the specific network device with the unique serial number and the global password. At Step 28, the encrypted unit-unique password is stored in non-volatile storage on the specific network device.

In one exemplary preferred embodiment of the present invention, at Step 22 the unique serial number for a network device is obtained for the specific network device. In such an embodiment, the unique serial may be obtained by scanning a bar-code affixed to the network device or from Flash memory or other non-volatile storage on the specific network device. As is known in the art, Flash memory is non-volatile storage that can be electrically written, erased and rewritten with data.

At Step 24, a global password used for a type network device that includes the specific network device is obtained. In one exemplary preferred embodiment of the present invention, the global password is same for all network devices of the same type. In another exemplary preferred embodiment of the present invention, the global password is based on a model number for a network device, year of manufacture, version of computer software, version of computer hardware, or other parameters and differs based on such parameters.

At Step 26, an encrypted unit-unique password is generated for the network device with the unique serial number and the global password. In exemplary preferred embodiments of the present invention, the encrypted unit-unique password is generated using any suitable robust encryption scheme known in the art (e.g., RSA, DES, PGP, etc.). In one exemplary preferred embodiment of the present invention, Step 26 includes generating an encrypted unit-unique password that includes encrypting the global password using the unique serial number as an encryption key. In another exemplary preferred embodiment of the present invention, Step 26 includes encrypting the unique serial number using the global password as an encryption key. However, other encryption keys can also be used and the present invention is not limited to the encryption keys described.

At Step 28, the encrypted unit-unique password is stored in non-volatile storage on the specific network device. In one exemplary preferred embodiment of the present invention, the encrypted unit-unique password is stored in Flash memory or Flash ROM on the specific network device. However, the present invention is not limited to storing the encrypted unit-unique password in Flash memory, and other non-volatile storage on the network device can also be used.

Providing an Emergency Unit-specific Password for a Network Device

Figure 3:
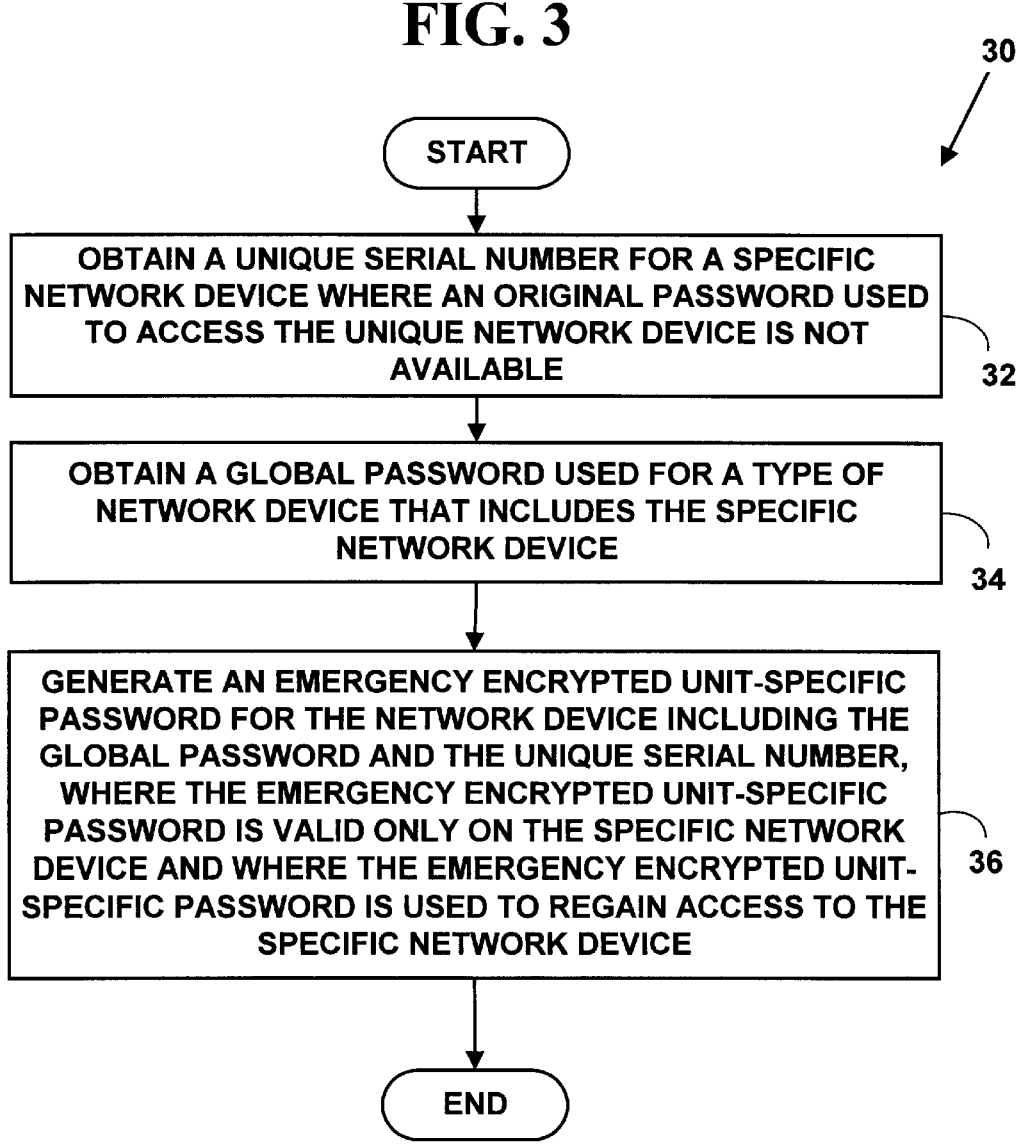
FIG. 3 is a flow diagram illustrating a method for providing an emergency unit-specific password for a network device.

FIG. 3 is a flow diagram illustrating a Method 30 for providing an emergency unit-specific password for a network device. At Step 32, a unique serial number is obtained for a specific network device for which an original password used to access the specific network device has been lost or is otherwise now unavailable. The specific network device includes an encrypted unit-unique password stored in non-volatile storage. At Step 34, a global password used for a type of network device that includes the specific network device is obtained. At Step 36, an encrypted emergency unit-specific password for the specific network device is generated with the unique serial number and the global password. The encrypted emergency unit-specific password is valid only on the specific network device with the unique serial number. The encrypted emergency unit-specific serial number is used to regain access to the specific network device.

In one exemplary preferred embodiment of the present invention, at Step 32, a unique serial number is obtained for a specific network device for which an original password to access the specific network device has been lost or is otherwise now unavailable. The specific network device includes an encrypted unit-unique password stored in non-volatile storage on the specific network device. In such an embodiment, the unique serial number may be obtained from a bar-code affixed to the network device or from non-volatile storage on the specific network device. However, other methods may also be used to obtain the unique serial number for the specific network device and the present invention is not limited to these methods.

At Step 34 a global password used for a type of network device that includes the specific network device is obtained. In one exemplary preferred embodiment of the present invention, an owner of a network device may call customer support with a unique serial number for a unique network device and a customer support technician would enter the unique serial number into a computer software application that included the global password. However, the present invention is not limited to such a scenario, and Method 30 can also be an automated process and used without making a call to a customer support technician.

At Step 36, an encrypted emergency unit-specific password for the specific network device is generated with the unique serial number and the global password. The encrypted emergency unit-specific password is valid only on the specific network device with the unique serial number. The encrypted emergency unit-specific serial number is used to regain access to the specific network device.

In exemplary preferred embodiments of the present invention, the encrypted unit-specific password is generated using any suitable robust encryption scheme known in the art (e.g., RSA, DES, PGP, etc.). In one exemplary preferred embodiment of the present invention, Step 36 includes generating an emergency encrypted unit-specific password that includes encrypting the global password using the unique serial number as an encryption key. In another exemplary preferred embodiment of the present invention, Step 26 includes encrypting the unique serial number using the global password as an encryption key. However, other encryption keys can also be used and the present invention is not limited to the encryption keys described.

Using an Emergency Unit-specific Password on a Specific Network Device

Figure 4:
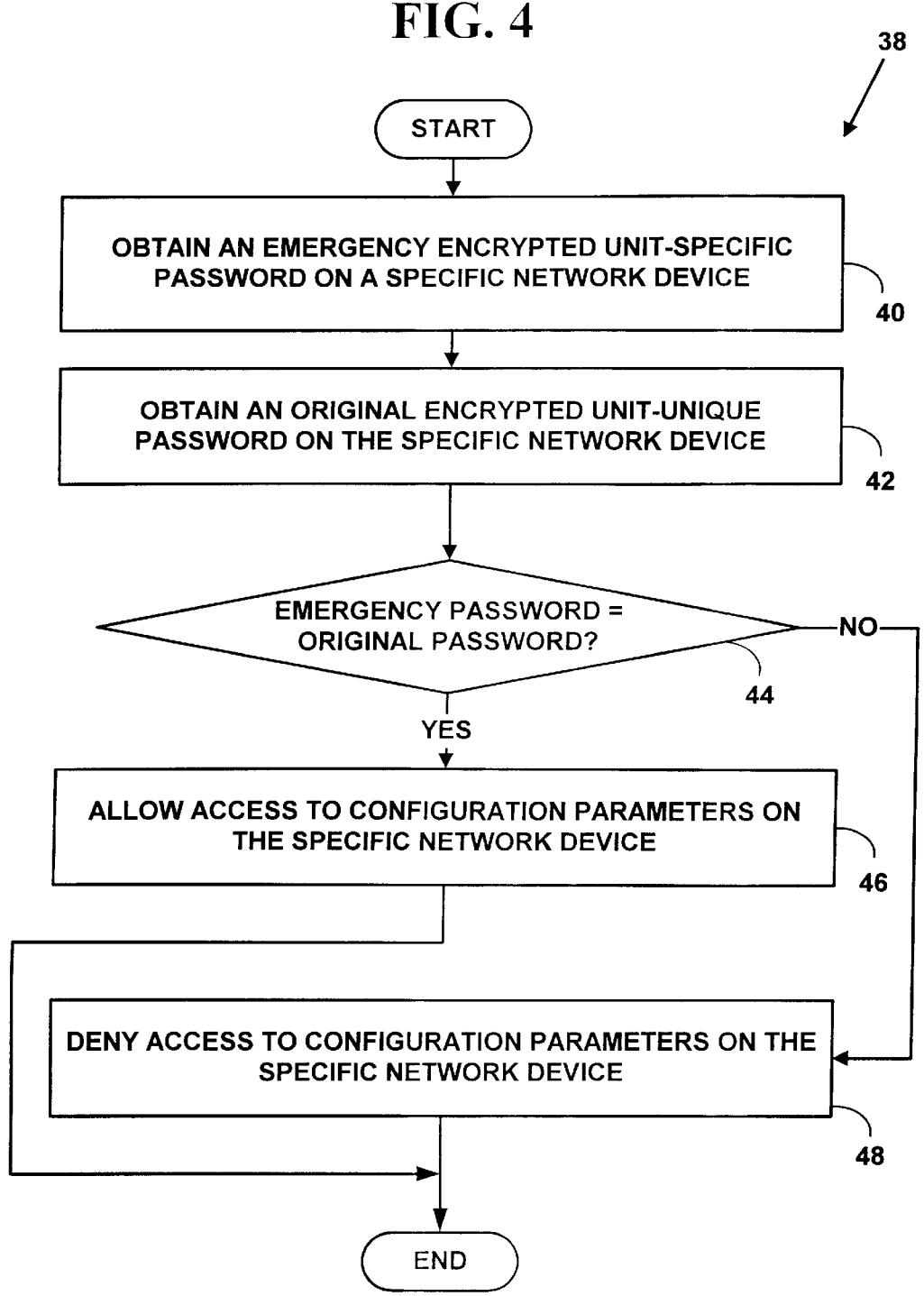
FIG. 4 is a flow diagram illustrating a method for using an emergency unit-specific password for a specific network device.

FIG. 4 is a flow diagram illustrating a Method 38 for using an emergency unit-specific password for a specific network device. At Step 40, an emergency encrypted unit-specific password is obtained on a specific network device for which an original password used to access the specific network device has been lost or is otherwise now unavailable. The emergency encrypted unit-specific password includes a unique serial number for the specific network device and a global password used for a type of network device that includes the specific network device. At Step 42, an original encrypted unit-unique password is obtained on the specific network device from non-volatile storage on the specific network device. The original encrypted unit-unique password includes a unique serial number for the specific network device and a global password used for a type of network device that includes the specific network device. At Step 44, a test is conducted to determine whether the emergency encrypted unit-specific password matches the original encrypted unit-unique password for the specific network device. If at Step 44, the emergency encrypted unit-specific password matches the original encrypted unit-unique password for the specific network device, at Step 46, access is allowed to configuration parameters on the specific network device. If at Step 44, the emergency encrypted unit-specific password does not match the original encrypted unit-unique password for the specific network device, at Step 48, access is denied to configuration parameters on the specific network device.

In one exemplary preferred embodiment of the present invention, at Step 40 an emergency encrypted unit-specific password is obtained on a specific network device for which an original password used to access the specific network device has been lost or is otherwise now unavailable. In such an embodiment the emergency encrypted unit-specific password is obtained using Method 30 of FIG. 3. However, other method can also be used to obtain an emergency encrypted unit-specific password and the present invention is not limited to using Method 30 of FIG. 3 to obtain such a password.

At Step 42, an original encrypted unit-unique password is obtained for the specific network device from non-volatile storage on the specific network device. The original encrypted unit-unique password includes a unique serial number for the specific network device and a global password used for a type of network device that includes the specific network device. In one exemplary preferred embodiment of the present invention, the original encrypted unit-unique password is obtained from Flash memory or Flash ROM on the specific network device. However, the present invention is not limited to obtaining the original encrypted unit-unique password in Flash memory, and other non-volatile storage on the network device can also be used.

At Step 44, a test is conducted to determine whether the emergency encrypted unit-specific password matches the original encrypted unit-unique password for the specific network device. If at Step 44, the encrypted emergency unit-specific password matches the encrypted unit-unique password for the specific network device, at Step 46, access is allowed to configuration parameters on the specific network device. If at Step 44, the emergency encrypted unit-specific password does not match the original encrypted unit-unique password for the specific network device, at Step 48, access is denied to configuration parameters on the specific network device. In one exemplary preferred embodiment of the present invention, a computer software application on the specific network device conducts the test at Step 44.

Emergency Password System

Figure 5:
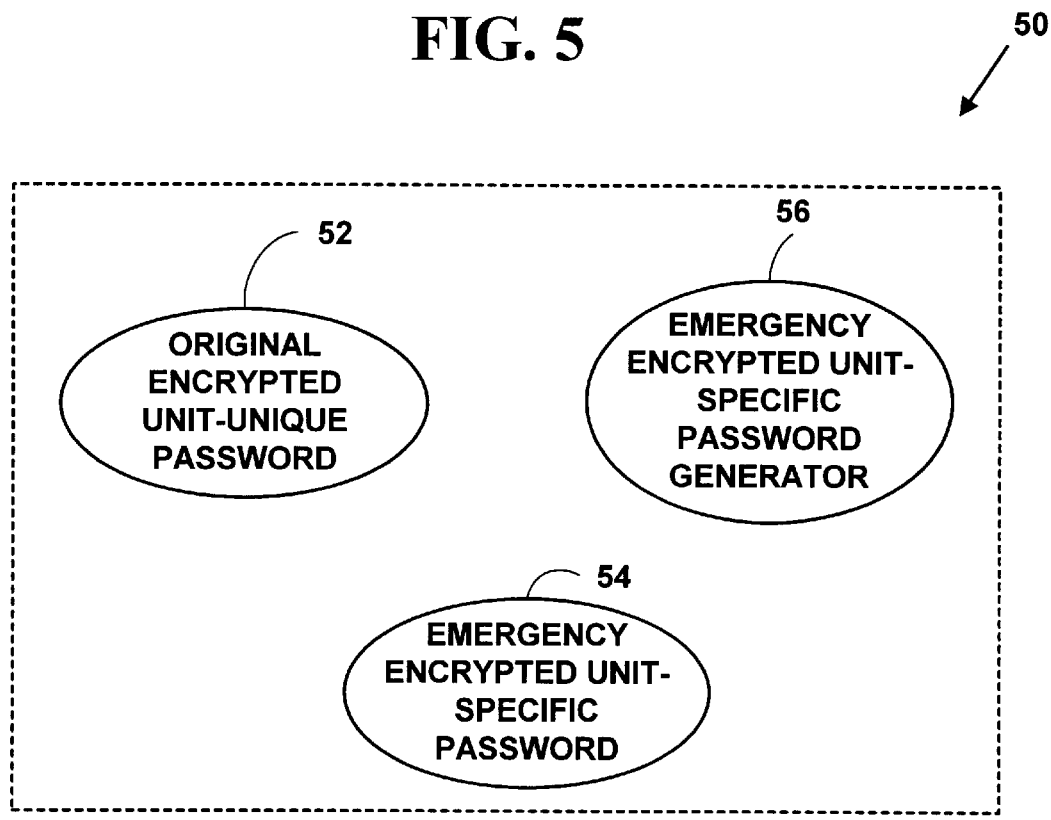
FIG. 5 is a block diagram illustrating an emergency password system.

FIG. 5 is a block diagram illustrating an emergency password system 50. The emergency password system includes an original encrypted unit-unique password 52, an emergency encrypted unit-specific password 54, and an emergency encrypted unit-specific password generator 56. However, more or fewer components can also be used in the emergency password system 50, and the present invention is not limited to the emergency password system illustrated in FIG. 5.

The original encrypted unit-unique password 52 is used for identifying a specific network device. The original encrypted unit-unique password includes a unique serial number and a global password used for a type of network device that includes the specific network device. In exemplary preferred embodiment of the present invention, the original encrypted unit-unique password is generated using Method 20 of FIG. 2. However, the present invention is not limited to using Method 20 to generate an original encrypted unit-unique password and other methods can also be used to generate the original encrypted unit-unique password.

The emergency encrypted unit-specific password 54 is used for accessing a specific network device. An original password used to access the specific network device is not available. The emergency encrypted unit-specific password includes a unique serial number for the specific network device and a global password used for a type of network device that includes the specific network device. In exemplary preferred embodiment of the present invention, the emergency encrypted unit-unique password 54 is generated using Method 30 of FIG. 3. However, the present invention is not limited to using Method 30 to generate an emergency encrypted unit-unique password and other methods can also be used to generate the emergency encrypted unit-unique password.

The emergency encrypted unit-specific password generator 56 is used for generating an emergency encrypted unit-specific password for a specific network device. The emergency encrypted unit-specific password includes a unique serial number for the specific network device and a global password used for a type of network device that includes the specific network device. The emergency encrypted unit-specific password is used to regain access to the specific network device. In an exemplary preferred embodiment of the present invention, the emergency encrypted unit-specific password generator 56 uses Method 30 of FIG. 3 to generate passwords. However, the emergency encrypted unit-specific password generator 56 can also use other methods to generate passwords and is not limited to Method 30.

The methods and system described herein can be used to provide secure emergency access to network devices. The secure emergency access helps close security holes for providing access to configuration parameters in a network device by using an encrypted unit-unique password including a unique serial number for a specific network device and a global password a global password used for a type of network device that includes the specific network device.

Preferred embodiments of the present invention are used with network devices such as routers, gateways, telephony switching hubs and other network devices. Preferred embodiments of the present invention can also be used for wireless phones to limit access to a network device identifier and telephone number data to prevent "cloning."

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. In a network device, a method for creating a secure unit-unique password for the network device, comprising the steps of:

obtaining a unique serial number for a specific network device;

obtaining a global password used for a type network device that includes the specific network device; and generating an encrypted unit-unique password for the specific network device with the unique serial number and the global password; and storing the encrypted unit-unique password in non-volatile storage on the specific network device.

2. A computer readable medium having stored therein instructions for causing a central processing unit to execute the method of claim 1.

3. The method of claim 1 wherein the step of obtaining a unique serial number for a network device includes obtaining the unique serial number from non-volatile storage on the specific network device.

4. The method of claim 1 wherein the step of generating an encrypted unit-unique password includes encrypting the global password using the unique serial number as an encryption key.

5. The method of claim 1 wherein the step of generating an encrypted unit-unique password includes encrypting the unique serial number using the global password as an encryption key.

6. The method of claim 1 wherein the step of storing the encrypted unit-unique password in non-volatile storage on the network device includes storing the encrypted unit-unique password in any of flash memory or flash read only memory on the network device.

7. A method for providing an emergency unit-specific password for a network device, comprising the steps of:

obtaining a unique serial number for a specific network device, wherein an original password used to access the specific network device is not available and wherein the specific network device includes an encrypted unit-unique password in non-volatile storage on the specific network device;

obtaining a global password used for a type of network device that includes the specific network device; and generating an encrypted emergency unit-specific password for the specific network device with the unique serial number and the global password, wherein the encrypted emergency unit-specific password is valid only on the specific network device with the unique serial number, and wherein the encrypted emergency unit-specific password is used to regain access to the specific network device.

8. A computer readable medium having stored therein instructions for causing a central processing unit to execute the method of claim 7.

9. The method of claim 7 wherein the step of generating an encrypted emergency unit-unique password for the specific network includes encrypting the global password using the unique serial number as an encryption key.

10. The method of claim 7 wherein the step of generating an encrypted emergency unit-unique password for the specific network device includes encrypting the unique serial number using the global password as an encryption key.

11. A method for using an emergency unit-specific password for a specific network device, comprising the steps of:

obtaining an emergency encrypted unit-specific password on a specific network device, wherein an original password used to access the specific network device is not available, and wherein the emergency encrypted unit-specific password includes a unique serial number for the specific network device and a global password used for a type of network device that includes the specific network device;

obtaining an original encrypted unit-unique password on the specific network device from non-volatile storage on the specific network device, wherein the original encrypted unit-unique password includes a unique serial number for the specific network device and a global password used for a type of network device that includes the specific network device;

determining whether the emergency encrypted unit-specific password matches the original encrypted unit-unique password on the specific network device, and if so, allowing access to configuration parameters on the specific network device.

12. A computer readable medium having stored therein instructions for causing a central processing unit to execute the method of claim 11.

13. The method of claim 11 further comprising:

determining whether the encrypted emergency unit-specific password matches the encrypted unit-unique password for the specific network device, and if not, not allowing access to configuration parameters on the specific network device.

14. The method of claim 11 wherein the specific network device includes any of a router, telephony switching hub, or a wireless phone.

15. The method of claim 11 wherein the encrypted emergency unit-specific password includes an encrypted global password using a unique serial number for the specific network device as an encryption key.

16. The method of claim 11 wherein the original encrypted unit-unique password for the specific network device includes an encrypted global password using a unique serial number for the specific network device as an encryption key.

17. The method of claim 11 wherein the original encrypted unit-unique password includes an encrypted unique serial number for the specific network device using a global password as an encryption key.

18. The method of claim 11 wherein the encrypted emergency unit-specific password includes an encrypted unique serial number for the specific network device using a global password as an encryption key.

19. An emergency password system for network devices, comprising in combination:

an original encrypted unit-unique password for identifying a specific network device, wherein the original encrypted unit-unique password includes a unique serial number and a global password used for a type of network device that includes the specific network device;

an emergency encrypted unit-specific password for accessing a specific network device, wherein an original password used to access the specific network device is not available, and wherein the emergency encrypted unit-specific password includes a unique serial number for the specific network device and a global password used for a type of network device that includes the specific network device; and an emergency encrypted unit-specific password generator for generating an emergency encrypted unit-specific password for a specific network device, wherein the emergency encrypted unit-specific password includes a unique serial number for the specific network device and a global password used for a type of network device that includes the specific network device, and wherein the emergency encrypted unit-specific password is used to regain access to the specific network device.

20. A method for using an emergency unit-specific password for router, comprising the steps of:

obtaining an emergency encrypted unit-specific password on a router, wherein an original password used to access the router is not available, and wherein the emergency encrypted unit-specific password includes a unique serial number for the router and a global password used for routers;

obtaining an original encrypted unit-unique password for the router from non-volatile storage on the router, wherein the original encrypted unit-unique password includes a unique serial number for the router and a global password used for routers;

determining whether the emergency encrypted unit-specific password matches the original encrypted unit-unique password for the router, and if so, allowing access to routing tables on the router; and if not, denying access to routing tables on the router.

21. A computer readable medium having stored therein instructions for causing a central processing unit to execute the method of claim 20.

* * * * *